Aug. 21, 1923.

R. SCHUMANN 1,465,366

MACHINE FOR CUTTING SPECTACLE GLASSES

Filed Feb. 2, 1921

Inventor
Robert Schumann

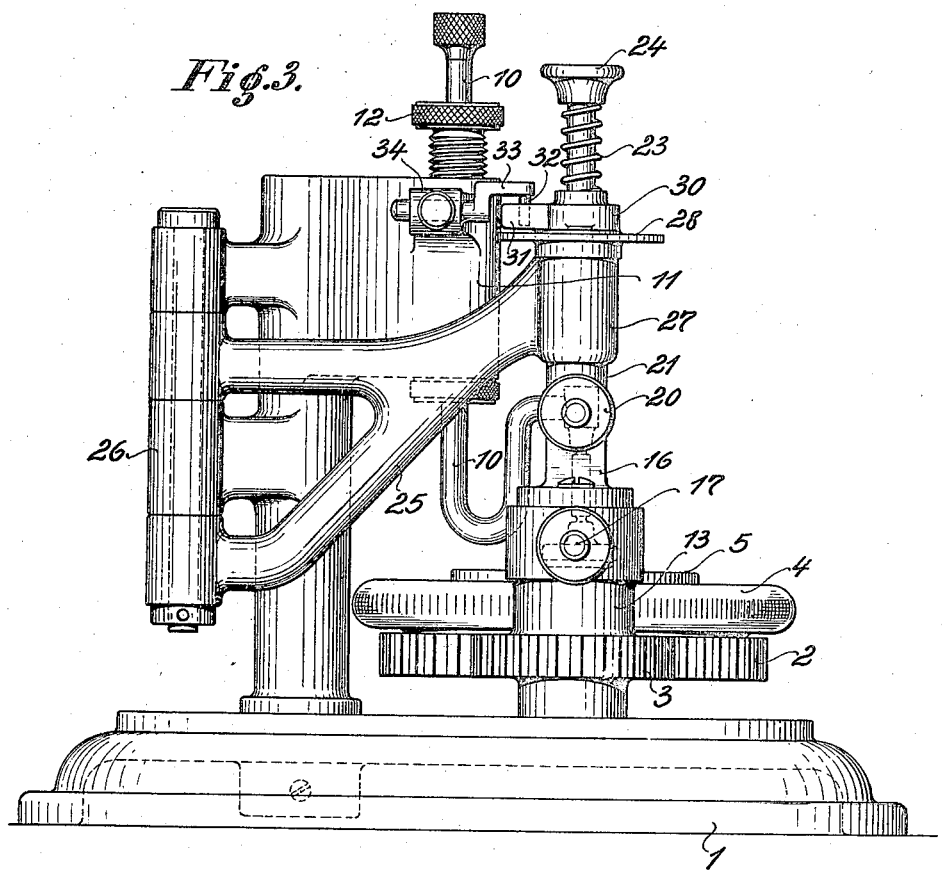

Aug. 21, 1923.
R. SCHUMANN
1,465,366
MACHINE FOR CUTTING SPECTACLE GLASSES
Filed Feb. 2, 1921
4 Sheets-Sheet 4
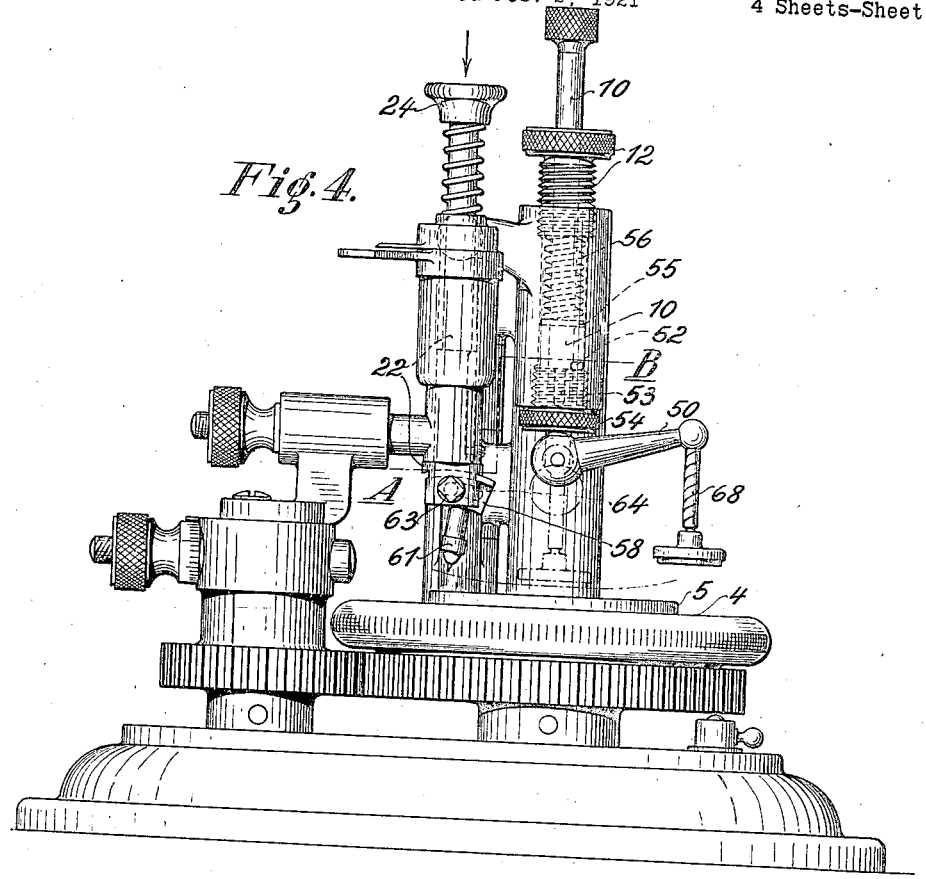
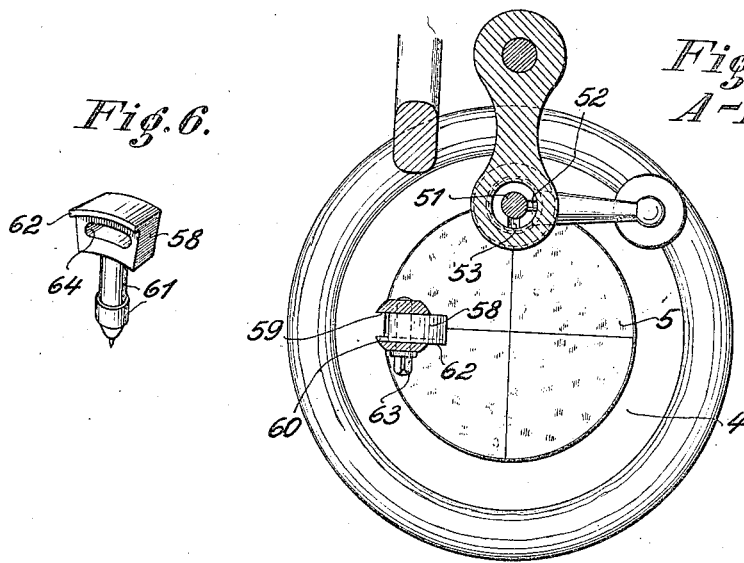
Inventor
Robert Schumann Patented Aug. 21, 1923.

1,465,366

UNITED STATES PATENT OFFICE.

ROBERT SCHUMANN, OF DUSSELDORF, GERMANY.

MACHINE FOR CUTTING SPECTACLE GLASSES.

Application filed February 2, 1921. Serial No. 441,809.

*To all whom it may concern:*

Be it known that I, ROBERT SCHUMANN, a citizen of the German Republic, and residing at Dusseldorf, Germany, have invented certain new and useful Improvements in a Machine for Cutting Spectacle Glasses, of which the following is a specification.

The present invention relates to a machine for cutting spectacle glasses, in which the shape of the said glass is obtained by a rocking movement of the glass cutter, the glass cutter being radially moved during the rotation of the glass, by means of a crank which revolves at one-half of the angular velocity as the glass.

In the accompanying drawings two constructional forms of the invention are shown.

Fig. 1 is a front elevation. Fig. 1ª, is a section taken on the line 1ª—1ª of Fig. 1. Fig. 2 a plan and Fig. 3 a side elevation of the first constructional form.

Fig. 4 is a front elevation of another constructional form.

Fig. 5 is a section on the line A—B in Fig. 4.

Fig. 6 is a separate view of the diamond holder.

Figure 1:
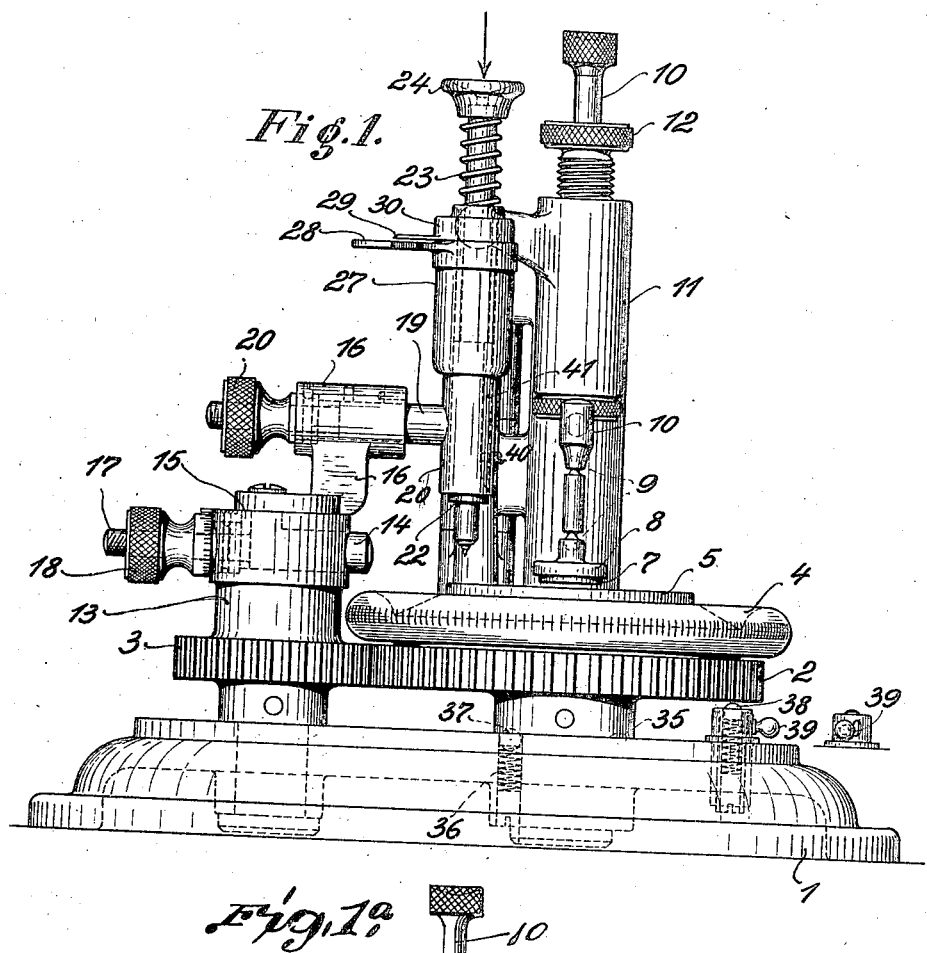

The gear wheels 2 and 3 which are journalled in the base-plate 1, have a ratio of 1:2. The manually rotatable table 4 attached to wheel 2 is fitted with a facing of rubber or cork 5, on which the glass to be cut is placed. The head 8, which is likewise fitted with a rubber facing 7, is coupled by means of two ball bearings 9 to a rod 10, which is guided in the bore of a stationary pillar 11. As is shown in Fig. 1ª, the rod 10 is formed internally of the pillar 11 with a flange 10¹ engaged by the lower end of a spring 10² the upper end of which bears against the bottom face of a screw 12 screwing in the upper part of the pillar 11 and adapted to regulate the tension of the spring 10². By the said spring the rod 10 is pressed downwardly and with the head 8 in engagement with a glass placed on the table 5. For removing the glass the rod 10 and the head 8 are retracted therefrom and rocked laterally.

Within a transverse bore of the upper part of the hub 13 of the small wheel 3 a slide 14 is mounted, which is formed with an upwardly extending crank pin 15 engaging in a vertical bore of a slide 16 bearing on the upper face of the hub 13. By means of a screw 17 the slide 14 may be shifted, and the nut 18 on said screw is provided with a graduation for indicating the degree to which the stud 18 is displaced from the axis of the wheel. In the slide 16 is provided a horizontal bore, in which is fitted an arm 19 carrying the glass cutter, which is displaceable by means of a nut 20. To arm 19 is attached a sleeve 21, in which the diamond holder 22 is movably fitted and held by a spring 23, bearing against a knob 24. The said sleeve is fitted in another sleeve 27 which is rockingly pivoted by means of an arm 25 over which plays an index 29 attached to a ring 30, which is revolubly fitted on sleeve 27, and carries a fork 31, in which engages a pin 32 on a rod 33. This rod 33 is displaceably fitted in an eye 34 attached to the stationary pillar 11.

In the hub of wheel 2 is a recess 35, into which engages a ball 37 supported by a spring 36, when the graduation on the table is set to —0—. Another ball 38, supported in the base plate 1 will, after an arrester 39 has been released, bear against the wheel 2 and serve as stop therefor by means of two recesses provided therein diagonally opposite each other.

The operation in cutting a glass is as follows:

After the graduation on the table has been set to —0—, the ratio of the axes of the ellipse to be cut is set by means of nut 18, and thereupon by means of nut 20 the length of the greater axis. The latter indicated on the dial 28. The glass is then clamped by swinging the head 8 into the clamping position in which it is pressed downward by its spring and the glass cutter is pressed down against the glass. Now the table 4 is turned once round, until the ball 37 again engages into the recess 38.

The figure cut will be that of a circle if the stud 15 coincides with the axis of the wheel 3, because the slide 18 will, in this case, perform no movement. The more eccentrically the stud 15 is set, the greater will be the stroke of the slide 16 and of the glass cutter twice during one revolution of the glass, and radially to the latter so that an ellipse is produced.

It is also possible to cut glasses of a sickle shape with half circular and half elliptical outlines, or also with cut out outlines (pantoscopic glasses). For this purpose the ball stop 38 is employed, as after one-half revolution of the glass the ball 38 will engage in its recess whereupon the machine is set for cutting the other half outline.

Figure 2:
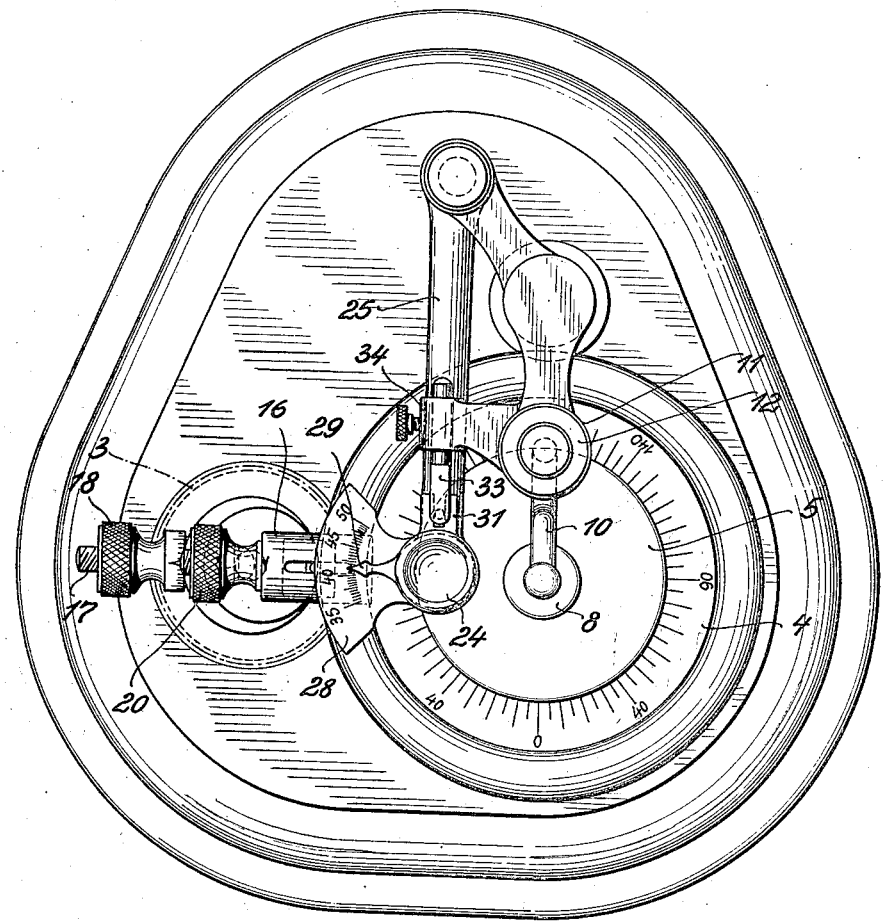

The general construction of the modification shown in Figs. 4 and 6 is similar to that of the example shown in Figs. 1 to 3, and corresponding parts have received similar reference characters. However, the glass holding means and the cutter holding means are constructed in a different way. As shown the head 8 is mounted on a coiled spring 68 attached to an arm 50 and permitting slight movement of the head 8 in a similar way as the ball bearings 9 described with reference to Figs. 1 to 3. The arm 50 is connected with a vertical rod 10 formed with a collar 55 and guided in a bore of the pillar 11. To the top and bottom ends of the said bore screw plugs 54 and 12 respectively are screwed, and the plug 54 is formed internally with a vertical slot 53 adapted with the head 8 in glass holding position for engagement with a pin 52 secured to the rod 10. Between the top face of the collar 55 and the bottom face of the screw plug 12 a spring 56 is interposed, which tends to force the rod 10 downwardly and with the head 8 on the glass placed on the table 4. While the apparatus is out of operation the arm 50 and the head 8 are in the position shown in Fig. 4, the pin 52 bearing on the top face of the screw plug 54. For holding a blank on the cork facing 5 of the table the arm 50 is rocked about the axis of the rod 10 into position with the head 8 axially above the table and the blank placed thereon, whereupon the spring 56 forces the head 8 into engagement with the blank, the pin 52 engaging in the vertical slot 53.

For obtaining a better cut with convex or concave glasses, the diamond, or the diamond holder should be, practically, at right angles to the surface of the glass being cut. Therefore the diamond holder socket 61 is preferably disposed in a head 58 which is adjustable in a slot 59 of the holder 22. The head 58 engages with a ledge 62 in a groove 60 in said slot 59. By means of a set screw 63 which passes through a slot 64 in the head, the latter can be clamped in position.

For cutting the glass the diamond is pressed down against the glass by means of a knob 24 fitted to the upper end of the holder 22.

I claim:

1. In a machine for cutting spectacle glasses, the combination, with rotary means for holding the glass, and means movable toward and from the center of said glass holding means for holding the glass cutter, of crank mechanism for operating the cutter holding means, and means for operating said glass holding means and crank mechanism.

2. In a machine for cutting spectacle glasses, the combination, with rotary means for holding the glass, and means movable towards and from the center of said glass holding means for holding the glass cutter, of crank mechanism disposed at the side of the glass holding means for operating the cutter holding means, and means for operating said glass holding means and crank mechanism.

3. In a machine for cutting spectacle glasses, the combination, with rotary means for holding the glass, and means movable toward and from the center of said glass holding means for holding the glass cutter, of a rotary member carrying an operating member constructed for moving the cutter holding means toward and from the center of the glass holding means, and an operative connection between said glass holding means and rotary member for insuring operation thereof with different numbers of revolution.

4. In a machine for cutting spectacle glasses, the combination, with rotary means for holding the glass, and means movable toward and from the center of said glass holding means for holding the glass cutter, of a rotary member carrying an operating member constructed for moving the cutter holding means toward and from the center of the glass holding means, and an operative connection between said glass holding means and rotary member for insuring operation thereof at the ratio of 1 to 2.

5. In a machine for cutting spectacle glasses, the combination, with rotary means for holding the glass, and means movable toward and from the center of said glass holding means for holding the glass cutter, of a rotary member carrying an operating member adjustable radially of the rotary member and constructed for moving the cutter holding means toward and from the center of the glass holding means, and an operative connection between said glass holding means and rotary member for insuring operation thereof with different numbers of revolution.

6. In a machine for cutting spectacle glasses, the combination, with rotary means for holding the glass, and means movable toward and from the center of said glass holding means for holding the glass cutter, of crank mechanism for operating the cutter holding means, said crank mechanism comprising a crank pin which is adjustable towards and from its axis of rotation, and means for operating said glass holding means and crank mechanism.

7. In a machine for cutting spectacle glasses, the combination, with rotary means for holding the glass, and means movable toward and from the center of said glass holding means for holding the glass cutter, of a rotary member disposed at the side of the glass holding means and carrying an operating member adapted to transform rotary movement into reciprocating movement, a connection adjustable in length between said operating member and cutter holding means for setting the cutter holding means toward and from the center of the glass holding means, and operating means for said glass holding means and rotary member.

8. In a machine for cutting spectacle glasses, the combination, with rotary means for holding the glass, and means movable toward and from the center of said glass holding means for holding the glass cutter, of crank mechanism for operating the cutter holding means, said crank mechanism comprising a crank pin which is adjustable toward and from its axis of rotation and a connection adjustable in length between said crank pin and cutter holding means, and means for operating said glass holding means and crank mechanism.

9. Machine for cutting spectacle glasses consisting of a base plate, two meshing gear wheels of different diameters, rotatably mounted on said base plate, on the larger gear wheel a table for carrying the glass, means for holding the glass on this table, an arm mounted on said base plate to swing over and toward and from the center of the large gear, a glass cutter mounted in said arm, and means connected to the small gear for swinging said arm.

10. Machine for cutting spectacle glasses consisting of a base plate, two gear wheels of different diameters rotatably mounted on said base plate, a table for the glass on the larger gear wheel, a liftable pressure device for holding the glass on said table, an arm mounted on said base plate to swing over and toward and from the center of the large gear wheel, a glass cutter mounted in said arm, means for transforming the rotary movement of the small gear wheel into reciprocating movement, and an operative connection adjustable in length intermediate said transforming means and glass cutter.

11. Machine for cutting spectacle glasses consisting of a base plate, two gear wheels journalled thereon, the diameters of said gear wheels being at a ratio of 1:2, a flange for turning the larger wheel by hand, an elastic support for the glass on the larger gear wheel, a liftable and swivelling pressure device for holding the glass on the said support, a swivel arm on the base plate, a glass cutter attached to this swivel arm, an eccentric stud on the shaft of the smaller gear wheel, means for varying the eccentricity of this stud, a connection, adjustable in length between this stud and the glass cutter, and a stop on the base plate for the larger gear wheel.

12. Machine for cutting spectacle glasses, consisting of a base plate, two gear wheels journalled thereon, the diameters of said gear wheels at a ratio of 1:2, a flange on the larger gear wheel for turning it by hand, an elastic support for the glass on the larger gear wheel, an elastic pressure plate for the glass, a liftable arm rockingly mounted on said base plate and carrying said pressure plate and including a link having universal connection with said arm and pressure plate, a rocker mounted on said base plate to swing over and toward and from the center of the large gear wheel, a sleeve rockingly mounted on said rocker, a glass cutter guided in said sleeve, a spring tending to retract the glass cutter away from the glass, a transversely adjustable crank pin on the small gear wheel, an operative connection between said crank pin and arm, automatic means for arresting the apparatus after one complete rotation of the gear wheel of larger diameter, and releasable automatic means for arresting the apparatus after a partial rotation of the gear wheel of larger diameter.

13. In a machine for cutting spectacle glasses, the combination, with rotary means for holding the glass, and means movable toward and from the center of said glass holding means for holding the glass cutter, of a rotary member disposed at the side of the glass holding means and carrying an operating member constructed for moving the cutter holding means toward and from the center of the glass holding means, and operating means for said glass holding means and rotary member, automatic means for arresting the apparatus after one complete rotation of the glass holding means, and automatic and releasable means for arresting the apparatus after a partial rotation of the glass holding means.

14. Machine for cutting spectacle glasses consisting of a base plate, two gear wheels journalled thereon, the diameters of said gear wheels having a ratio of 1:2, on the larger gear wheel a flange for turning it by hand, an elastic support for the glass on the larger gear wheel, an elastic pressure plate for the glass, a liftable spring pressed arm rockingly mounted on said base plate and carrying said pressure plate and including a link having universal connection with said arm and pressure plate, a rocker mounted on said base plate to swing over and toward and from the center of the large gear wheel, a sleeve rockingly mounted on said rocker, an automatically retracted glass cutter holder shiftable in said sleeve, a slide adjustable on said smaller gear wheel transversely of the axis of the gear wheel, means to indicate the position of said slide and crank pin relatively to the axis of the small gear wheel, a connecting member secured to said sleeve and engaged by the crank pin and made in two parts adjustable relatively to each other for varying the length of said connecting member, and means to indicate the adjustment of said connecting member.

15. In a machine for cutting spectacle glasses, the combination, with rotary means for holding the glass, an arm mounted for swinging over and toward and from the axis of said rotary glass holding means, and a glass cutter mounted in said arm, of a rotary member disposed at the side of the glass holding means and carrying an operating member adapted to transform rotary movement into reciprocating movement and connected with said arm for operating the same.

In testimony whereof I affix my signature.

ROBERT SCHUMANN.